Feb. 20, 1951     J. R. LANCASTER     2,542,930
DASHBOARD LIGHT FOR INDICATING THE CONDITION
OF VEHICLE LIGHTS
Filed March 15, 1950
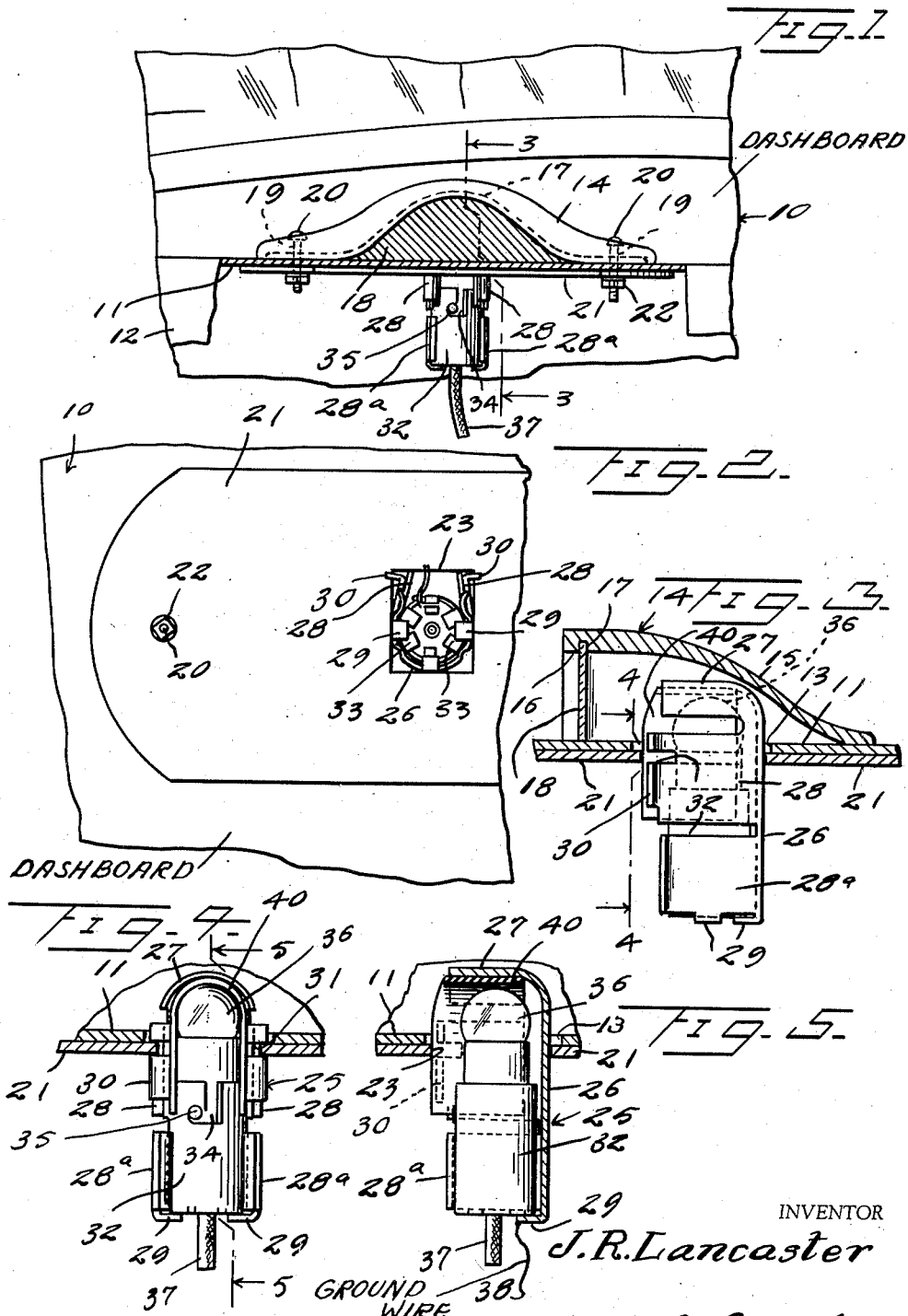

Patented Feb. 20, 1951

2,542,930

UNITED STATES PATENT OFFICE 2,542,930

DASHBOARD LIGHT FOR INDICATING THE CONDITION OF VEHICLE LIGHTS

John R. Lancaster, Goldsboro, N. C.

Application March 15, 1950, Serial No. 149,737

4 Claims. (Cl. 177—329)

This invention relates to a light indicator, and has as its primary object the provision of a light indicator for use in a motor vehicle to indicate to the driver thereof a predetermined condition of the headlights.

An additional and more specific object of the invention is the provision of such an indicator which will be relatively unobtrusive, and yet which will be readily visible to the driver of the vehicle to indicate when his lights are dimmed only, the indicator being illuminated when the dim lights are on, and not illuminated when the lights are either bright or out.

Still another object of the invention is the provision of such a device adapted to be positioned on the horizontal portion of the dashboard of the vehicle directly behind the steering wheel in such manner to be directly in the driver's line of vision without necessitating his taking his eyes from the road.

A more specific object of the invention is the provision of an illuminated indicator of substantially the size and shape of the human eye and adapted to produce a relatively dim and diffused light whereby no glare or bright illumination will impair the driver's vision.

A further and more specific object of the invention is the provision of an improved means for mounting the light attachment on the dashboard of the vehicle.

Still other objects will in part be obvious and in part be pointed out as the description of the invention proceeds, and shown in the accompanying drawing wherein there is disclosed a preferred embodiment of this inventive concept.

In the drawings:

Figure 1 is a front elevational view, partially in section, of one form of device embodying the instant inventive concept.

Figure 2 is a bottom plan view of the construction of Figure 1.

Figure 3 is an enlarged sectional view taken substantially along the line 3—3 of Figure 1 as viewed in the direction indicated by the arrows.

Figure 4 is a sectional view taken substantially along the line 4—4 of Figure 3 as viewed in the direction indicated by the arrows, and Figure 5 is a sectional view taken substantially along the line 5—5 of Figure 4 as viewed in the direction indicated by the arrows.

Similar reference characters refer to similar parts throughout the several views of the drawing.

Referring now to the drawings in detail, there is generally indicated at 10 a fragment of the dashboard of a motor vehicle, the horizontal portion thereof being indicated at 11, and the depending vertical portion thereof being indicated at 12.

A suitable aperture 13 is adapted to be cut in the horizontal portion 11 of the dashboard, and has positioned thereover a housing including a transversely arcuate member 14, which is tapered or sloped rearwardly as at 15 (see Figure 3) and provided with an open front face 16, the arcuate sloped portion thereof being hollow. The upper wall of the arcuate portion is provided with a transversely extending groove 17 adapted to receive the edge of a glass or composition panel 18 of colored translucent material, the preferred color being green. Suitable bores 19 passing through the end flattened portions of housing 14 accommodate bolts 20 which also extend through suitable apertures in the dashboard, and suitable aligned apertures in a rear holding or securing panel 21 (see Figures 1 and 2), the parts being held in related assembly as by means of nuts 22. Holding plate 21 is provided with a rectangular aperture 23, within which is adapted to be positioned a lamp and lamp socket housing generally indicated at 25. The housing 25 comprises a shell including a rear wall 26, a top wall 27 and side walls 28, as well as a plurality of base fingers 29.

An arcuate sheet of insulating material 40 extends upwardly between the side walls 28 and across the top wall 27. The side walls 28 terminate in outwardly flared flanges 30, which flanges are split as indicated at 31, and compressible, the arrangement being such that when the light and socket housing is positioned within the rectangular opening 23 the side edges of the opening will engage in the split portion 31, thus securely holding the housing in position relative to holding plate 21. The rear portions 28a of side walls 28 comprise resiliently bowed socket holding members of relatively lesser longitudinal extent than the walls 28 themselves between which members are adapted to be engaged a cylindrical socket member 32 of conventional design, the latter being metallic and including lower inturned fingers 33, as shown in Figure 2 adapted to hold a socket of insulating material therewithin. Socket 32 is provided with a bayonet slot 34 adapted to be engaged by the projections 35 on the base of a conventional small electric bulb 36. It will be noted that the assembly may be readily engaged and disengaged within the holding plate 21 merely by compression of the side walls 28, and that the socket and bulb may readily be removed from the housing 25 due to the fact that one side thereof is substantially open and only the spring compression of the parts secures the housing and bulb therewithin.

Extending from the base of socket 32 is a wire 37 adapted to be suitably connected in any desired conventional manner within the circuit of the dim bulbs of a motor vehicle in such manner that light bulb 36 may be illuminated only when the dim bulbs of the headlights are illuminated. A suitable ground wire 38 is also provided in a known manner.

From the foregoing it will now be seen that there is herein provided an improved vehicle light indicator which accomplishes all the objects of this invention and others, including many advantages of great practical utility and commercial importance.

As many embodiments may be made of this inventive concept and as many modifications may be made in the embodiment hereinbefore shown and set forth, it is to be understood that all matter herein is to be interpreted merely as illustrative and not in a limiting sense.

I claim:

1. A light indicator for motor vehicles comprising a hollow arcuate tapered housing adapted to be mounted on the horizontal shelf-like portion of the dashboard of said vehicle, said housing having a semi-elliptical opening in the front wall thereof, a pane of translucent, colored material closing said opening, and a light source in said housing.

2. A light indicator for motor vehicles comprising a hollow arcuate tapered housing adapted to be mounted on the horizontal shelf-like portion of the dashboard of said vehicle, said housing having a semi-elliptical opening in the front wall thereof, a pane of translucent colored material closing said opening, an opening in said dashboard beneath said housing, a holding plate having an aperture therein secured to said housing beneath said dashboard, a light socket and bulb holder adapted to be secured in said aperture, and a socket and bulb in said holder, said bulb extending into said housing.

3. The structure of claim 2 wherein the socket and bulb holder includes top and side walls and bottom retaining fingers, said side walls being resilient to hold said socket and bulb therein.

4. The structure of claim 3 wherein the side walls are provided with outwardly turned flanges having slots therein, the edges of the aperture in the holding plate being adapted to seat in said slots for securing the holder in position.

JOHN R. LANCASTER.

REFERENCES CITED

The following references are of record in the file of this patent:

UNITED STATES PATENTS

| Number | Name | Date |
|---|---|---|
| 1,031,976 | Weber | July 9, 1912 |
| 2,125,843 | Hall | Aug. 2, 1938 |
| 2,215,260 | Woodward | Sept. 17, 1940 |
| 2,465,753 | Ross, Jr. | Mar. 29, 1949 |